(12) United States Patent
Rodriguez et al.

(10) Patent No.: US 11,312,599 B2
(45) Date of Patent: Apr. 26, 2022

(54) DEVICE TETHERING SYSTEM AND METHOD

(71) Applicants: Rodolfo Rodriguez, Chicago, IL (US); Norma Alaniz, Chicago, IL (US)

(72) Inventors: Rodolfo Rodriguez, Chicago, IL (US); Norma Alaniz, Chicago, IL (US)

(*) Notice: Subject to any disclaimer, the term of this patent is extended or adjusted under 35 U.S.C. 154(b) by 411 days.

(21) Appl. No.: 16/671,369

(22) Filed: Nov. 1, 2019

(65) Prior Publication Data

US 2020/0148515 A1    May 14, 2020

Related U.S. Application Data

(60) Provisional application No. 62/757,456, filed on Nov. 8, 2018.

(51) Int. Cl.
| | | |
|---|---|---|
| *B66D 1/60* | (2006.01) | |
| *A45F 5/00* | (2006.01) | |
| *B65H 75/40* | (2006.01) | |
| *B65H 75/30* | (2006.01) | |
| *H04M 1/04* | (2006.01) | |
| *B65H 75/44* | (2006.01) | |

(52) U.S. Cl.
CPC ............. *B66D 1/60* (2013.01); *A45F 5/004* (2013.01); *B65H 75/30* (2013.01); *B65H 75/40* (2013.01); *B65H 75/4471* (2013.01); *H04M 1/04* (2013.01)

(58) Field of Classification Search
CPC .. A45F 5/004; A45F 2200/0516; A45F 5/021; A45F 5/02; A45F 5/00; H04M 1/04; B65H 75/30; B65H 75/40; B65H 75/4471; B66D 1/60
See application file for complete search history.

(56) References Cited

U.S. PATENT DOCUMENTS

| | | | | |
|---|---|---|---|---|
| 4,565,011 A | * | 1/1986 | Karger | B44D 3/38 242/375 |
| 4,907,348 A | * | 3/1990 | Hubbard, Jr. | G01B 3/1003 33/767 |
| 7,661,620 B2 | * | 2/2010 | Fields | A45F 5/004 242/379 |
| 8,600,461 B2 | * | 12/2013 | Kroupa | H04M 1/15 455/575.6 |
| 8,757,532 B2 | * | 6/2014 | Votel | B65H 75/4434 242/378 |
| 9,104,377 B2 | | 8/2015 | Rekuc et al. | |
| 9,179,762 B2 | | 11/2015 | Paugh et al. | |
| 9,364,040 B2 | | 6/2016 | Saladino | |
| 9,521,896 B2 | | 12/2016 | Peterson | |

(Continued)

OTHER PUBLICATIONS

Amazon, Running belt, Sep. 17, 2018, pp. 1.
Grainger, Retractable holster, Sep. 17, 2018, pp. 1.
LC, CLC pouch, Sep. 17, 2018, pp. 3.

*Primary Examiner* — Michael E Gallion
(74) *Attorney, Agent, or Firm* — Nyman IP LLC; Scott Nyman

(57) ABSTRACT

A device tethering system is provided for securing a device to a source location as may be assisted by a tether. The device tethering system may include a retraction component, tether, pouch, belt, device mounting component, device aspect of the device mounting component, and/or tether aspect of the device mounting component. A method for securing a device to a source location using the device tethering system is also provided.

18 Claims, 10 Drawing Sheets

(56) References Cited

U.S. PATENT DOCUMENTS

| | | | |
|---|---|---|---|
| 9,629,446 B2 | 4/2017 | Moreau et al. | |
| 9,629,447 B1 | 4/2017 | Martel et al. | |
| 9,913,526 B2* | 3/2018 | Abreu | F16B 2/10 |
| 10,730,718 B2* | 8/2020 | Castaneda | B65H 75/4471 |
| 10,791,846 B2 | 10/2020 | Gregory | |
| 2003/0042348 A1* | 3/2003 | Salentine | A45F 5/021 |
| | | | 242/380 |
| 2004/0035897 A1* | 2/2004 | Salentine | A45F 5/004 |
| | | | 224/162 |
| 2004/0089759 A1* | 5/2004 | Genuise | A45F 5/004 |
| | | | 242/379 |
| 2006/0163412 A1* | 7/2006 | Szarkowski | B65H 75/4434 |
| | | | 242/384 |
| 2007/0051842 A1* | 3/2007 | Pryor | A45C 11/182 |
| | | | 242/378.3 |
| 2010/0171021 A1* | 7/2010 | Smith | A45C 13/30 |
| | | | 248/558 |
| 2010/0206922 A1* | 8/2010 | Gross | A45F 5/004 |
| | | | 224/162 |
| 2010/0206976 A1* | 8/2010 | Salentine | A45F 5/004 |
| | | | 242/379.2 |
| 2012/0060256 A1 | 3/2012 | Parker | |
| 2013/0008933 A1 | 1/2013 | Clifford | |
| 2013/0168423 A1* | 7/2013 | Paugh | B65H 75/446 |
| | | | 224/162 |
| 2014/0175135 A1* | 6/2014 | Paugh | H04M 1/04 |
| | | | 224/219 |
| 2015/0097008 A1* | 4/2015 | Adeyemi | A45F 5/021 |
| | | | 224/162 |
| 2015/0157116 A1* | 6/2015 | Williams | A45F 5/004 |
| | | | 224/162 |
| 2015/0197973 A1* | 7/2015 | Day | B65H 75/4486 |
| | | | 242/371 |
| 2015/0311938 A1* | 10/2015 | Molnar | A45F 5/00 |
| | | | 455/575.8 |
| 2016/0286942 A1* | 10/2016 | Peterson | A45F 5/004 |
| 2017/0231375 A1* | 8/2017 | Moreau | B65H 75/48 |
| | | | 224/162 |
| 2018/0049493 A1 | 2/2018 | Graves | |
| 2018/0125213 A1* | 5/2018 | Palma | A45F 5/004 |
| 2019/0276269 A1* | 9/2019 | Castaneda | B65H 75/446 |

* cited by examiner

DEVICE TETHERING SYSTEM AND METHOD

CROSS REFERENCE TO RELATED APPLICATIONS

This application claims the benefit of and priority to U.S. Provisional Patent Application Ser. No. 62/757,456, filed Nov. 8, 2018, which is incorporated herein by reference in its entirety.

FIELD OF THE INVENTION

The present disclosure relates to a device tethering system. More particularly, the disclosure relates to securing a device to a source location via a tethering system.

BACKGROUND

Many people carry their cellular phones with them virtually everywhere they go. This trend seems to be increasing as access to cellular telephones and smartphones becomes more common. Smartphones are particularly becoming more and more integrated into the daily lives of consumers.

Many smartphones and other electronic devices include large glass-covered portions, slippery surfaces, and other characteristics that may increase the chance of dropping. Additionally, many smartphones and other electronic devices are considerably expensive to purchase, repair, or replace. In many cases, smartphones cannot be repaired and must be entirely replaced if dropped. No known solution exists to reduce the likelihood of a smartphone or other device being unintentionally dropped and damaged while retaining the usability of being able to interact with the device substantially on demand.

Therefore, a need exists to solve the deficiencies present in the prior art. What is needed is a tethering system to substantially secure a device such as a phone to a person. What is needed is a tethering system with a tether to hold a device such as a mobile phone to a person. What is needed is a tethering system to hold a device such as a phone close to a source location with the device being extendable from that location. What is needed is a tethering system with a pouch from which a device such as a phone may be extended, for example, using a tether. What is needed is a method for securing a device such as a phone to a person with the device being extendable from the person using a tether. What is needed is a method for extending and securing a device to a source location such as a pouch, belt, or person.

SUMMARY

An aspect of the disclosure advantageously provides a tethering system to substantially secure a device such as a phone to a person. An aspect of the disclosure advantageously provides a tethering system with a tether to hold a device such as a mobile phone to a person. An aspect of the disclosure advantageously provides a tethering system to hold a device such as a phone close to a source location with the device being extendable from that location. An aspect of the disclosure advantageously provides a tethering system with a pouch from which a device such as a phone may be extended, for example, using a tether. An aspect of the disclosure advantageously provides a method for securing a device such as a phone to a person with the device being extendable from the person using a tether. An aspect of the disclosure advantageously provides a method for extending and securing a device to a source location such as a pouch, belt, or person.

This disclosure relates to a tethering system to help secure a phone, smartphone, or other portable device to a person. The accessory may advantageously help secure a smartphone to a person to substantially prevent dropping, avoid misplacement of the phone, prevent lost phones, increase usability, and improve accessibility. The accessory may also be used with other devices such as a tablet, e-book, portable video game system, other portable electronics, or other portable devices.

According to an embodiment of this disclosure, a device tethering system is provided including a retraction component, a tether extending outwardly from a front retraction component surface of the retraction component, wherein a device mounting component is attached to a distal end of the tether, a pouch to hold the retraction component, and a belt installed to the pouch.

In another aspect, the retraction component may be substantially held within the pouch and the tether extends through a retraction component aperture located on the front retraction component surface and through a front pouch surface of the pouch.

In another aspect, the retraction component aperture may further include an aperture perimeter through which the tether is passable.

In another aspect, the retraction component further may include an interior space containing a spindle on to which the tether is at least partially and reversibly wound.

In another aspect, the spindle may include a rewinding feature.

In another aspect, the retraction component may include a pulley that is substantially cylindrical over which the tether passes.

In another aspect, the tether may be constructed of a material selected from the group consisting of cotton, hemp, nylon, polyester, polypropylene, polyethylene, and carbon fiber.

In another aspect, the device mounting component may include a device aspect to receive a device and a tether aspect installable to the distal end of the tether.

In another aspect, the device aspect and the tether aspect may be reversibly interlocking.

In another aspect, the device mounting component may include a release feature for disconnection of a device received by the device mounting component from the tether.

According to an embodiment enabled by this disclosure, a device tethering system is provided including a retraction component, tether, device mounting component, and a pouch. The retraction component may include an interior space including a spindle and a pulley. The tether may be at least partially, reversibly wound about the spindle, passed over the pulley, and extending outwardly through a retraction component aperture. The device mounting component may include a device aspect to receive a device and a tether aspect installed to a distal end of the tether. The pouch may hold the retraction component and at least one item. The retraction component may be removable from the pouch. The retraction component aperture may be located on a front retraction component surface of the retraction component.

In another aspect, a belt may be installed to the pouch.

In another aspect, the retraction component aperture may be located at an approximately central point on the front retraction component surface.

In another aspect, the device aspect and the tether aspect may be reversibly interlocking.

In another aspect, the device mounting component may further include a release feature allowing for disconnection from the tether.

According to an embodiment enabled by this disclosure, a method is disclosed for providing a device tethering system comprising. The method may include (a) providing a tether extending outwardly from a retraction component. The method may additionally include (b) attaching a device mounting component to a distal end of the tether, wherein the device mounting component may include a device aspect and a tether aspect. The method may further include (c) removably housing the retraction component within a pouch installed to a belt. The method may include (d) removably receiving a device via the device aspect. The method may additionally include (e) installing the tether aspect to the distal end of the tether.

In another aspect, the pouch may further include a pouch first belt attachment interface at a pouch first end and a pouch second belt attachment interface at a pouch second end.

In another aspect, the method may further include (f) at least partially extending the tether through an aperture on the front retraction component surface of the retraction component and through a front pouch surface of the pouch.

In another aspect, the tether may be selectively rewindable into the retraction component.

In another aspect, the device mounting component may further include a release feature allowing for disconnection from the tether.

Terms and expressions used throughout this disclosure are to be interpreted broadly. Terms are intended to be understood respective to the definitions provided by this specification. Technical dictionaries and common meanings understood within the applicable art are intended to supplement these definitions. In instances where no suitable definition can be determined from the specification or technical dictionaries, such terms should be understood according to their plain and common meaning. However, any definitions provided by the specification will govern above all other sources.

Various objects, features, aspects, and advantages described by this disclosure will become more apparent from the following detailed description, along with the accompanying drawings in which like numerals represent like components.

DETAILED DESCRIPTION

Figure 1:
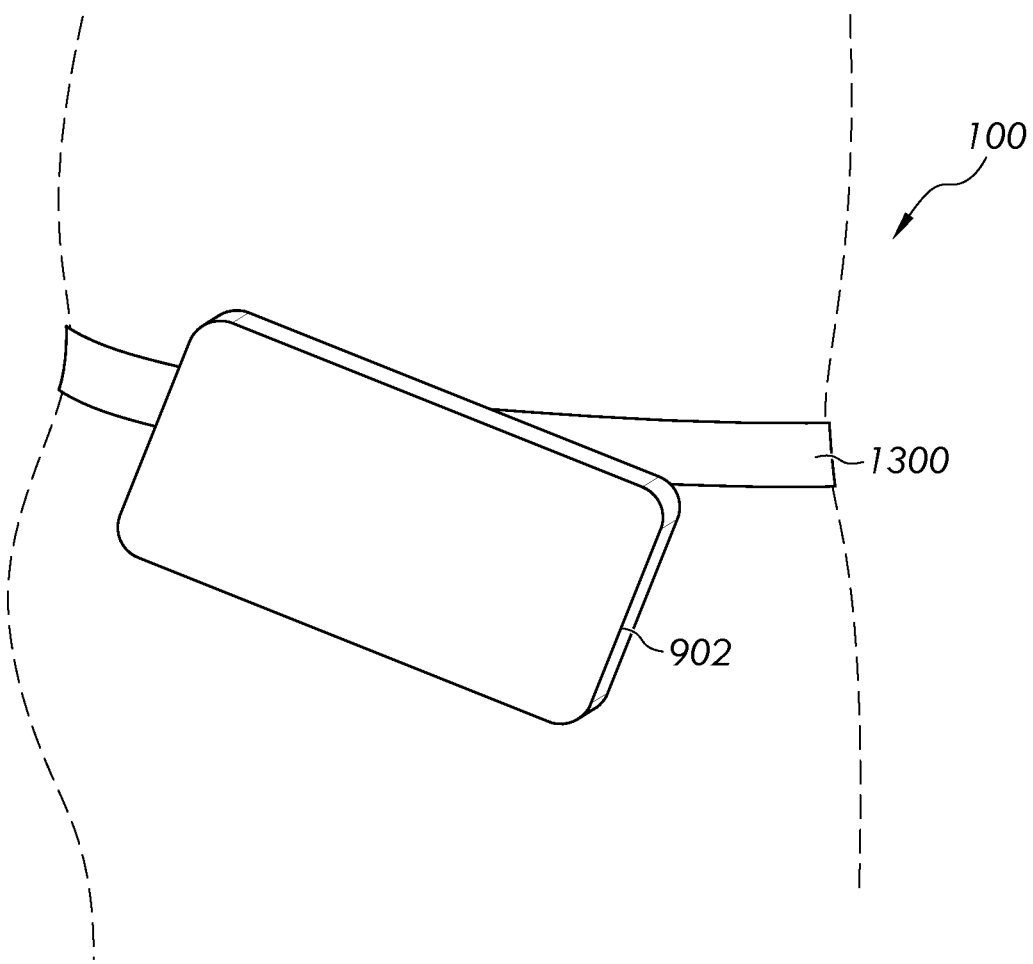
FIG. 1 is a perspective view of a tethering system worn by a user, according to an embodiment of this disclosure.

The following disclosure is provided to describe various embodiments of a device tethering system. Skilled artisans will appreciate additional embodiments and uses of the present invention that extend beyond the examples of this disclosure. Terms included by any claim of this nonprovisional utility application are to be interpreted as defined within this disclosure. Singular forms should be read to contemplate and disclose plural alternatives. Similarly, plural forms should be read to contemplate and disclose singular alternatives. Conjunctions should be read as inclusive except where stated otherwise.

Expressions such as "at least one of A, B, and C" should be read to permit any of A, B, or C singularly or in combination with the remaining elements. Additionally, such groups may include multiple instances of one or more elements in that group, which may be included with other elements of the group. All numbers, measurements, and values are given as approximations unless expressly stated otherwise.

Various aspects of the present disclosure will now be described in detail, without limitation. In the following disclosure, a device tethering system will be discussed. Those of skill in the art will appreciate alternative labeling of the device tethering system as a phone securing apparatus, tethered phone holder, tethered phone mount, phone accessory, the invention, or other similar names. Similarly, those of skill in the art will appreciate alternative labeling of the device tethering system as a phone securing method, extendable phone securing technique, device tethering method, method, operation, the invention, or other similar names. Skilled readers should not view the inclusion of any alternative labels as limiting in any way.

Referring now to FIGS. 1-13, the device tethering system 100 will now be discussed in more detail. The device tethering system may include a retraction component 200, tether 1100, pouch 1000, belt 1300, device mounting component 900, and optionally other features and aspects. The device mounting component may include a device aspect 700 of the device mounting component and a tether aspect 800 of the device mounting component. Additional components may be discussed in greater detail below, without limitation. The device tethering system may operate one or more of these components interactively with other components to assist with securing a device to a source location, for example, proximate to the body of a user.

For the purpose of this disclosure, the term belt is intended to include virtually any strap that may attach to an additional component described or enabled by this disclosure, without limitation. For the purpose of this disclosure, the term pouch is intended to include virtually any portion of a tethering system that can hold another object, for example, the retraction component, IDs, cash, credit cards, money, keys, additional devices, or other objects that would be apparent to a person of skill in the art. Other terms are intended to be interpreted broadly and not be limited by the examples given throughout this disclosure. For the purpose of this disclosure, the term device is intended to include phones, smart phones, tablets, personal electronics, and in some cases nonelectronic devices to be secured by a system enabled by this disclosure, without limitation.

A tethering system enabled by this disclosure may help secure a phone, such as a smartphone, or other portable device to a person. A tethering system enabled by this disclosure may advantageously reduce the likelihood of a person dropping, misplacing, mishandling, and otherwise misusing a phone. Additionally, a tethering system enabled by this disclosure may advantageously increase usability and improve accessibility of a connected device. A tethering system enabled by this disclosure may also be used with other devices such as a tablet, e-book, portable video game system, other portable electronics, or other portable devices.

The retraction component 200 will now be discussed in greater detail. FIGS. 2-6 and 10-13 highlight examples of the retraction component, which may also be shown in other figures. In one embodiment, the retraction component may be installed in a pouch from which an extendable tether may be drawn. The retraction component may include a retraction component aperture 302, which may be located on a retraction component front surface 304 of the retraction component so that the retraction component may be positioned in the pouch such that it may rest approximately flat on a wearer. This is believed to be an improvement over the traditional side-located aperture on known tether devices. The interior space of the retraction component may include guides, pulleys 206, and/or other components to direct the tether to a retraction component aperture 302 located on a retraction component front surface 304 of the retraction component 200.

In the interest of clearly conveying possible aspects of the retraction component, an example retraction component shown in FIGS. 2-6 will now be discussed, without limitation. In this example, the retraction component 200 may include a retraction component enclosure 208, which may include a retraction component base 210 and a retraction component cap 212. The interior space of the retraction component may be substantially open to allow the installation of additional components, such as a retraction component pulley 206, retraction component spindle 214, and retraction component spindle receiver 220. The retraction component 200 may be operatively installed to the retraction component base 210 to collectively form the retraction component enclosure 208.

The retraction component 200 may be configured in virtually any practical shape or size. In the interest of clarity, the embodiment of the retraction component 200 discussed in this example is approximately rectangular in shape. The retraction component may include a retraction component front surface 304, retraction component rear surface 500, retraction component top surface 300, retraction component bottom surface 306, retraction component first side surface 400, and retraction component second side surface 600. The above-mentioned retraction component surfaces may at least partially include aspects from the retraction component base 210 and/or the retraction component cap 212. Edges between multiple surfaces may be curved, beveled, flattened, rounded, orthogonal, or otherwise configured, without limitation. Additional features and/or designs may be included on one or more of the retraction component surfaces.

The retraction component 200 may additionally include a retraction component aperture 302 on one or more of the retraction component surfaces. In one embodiment, the retraction component aperture 302 may be located on the retraction component front surface 304. In this embodiment, the tether 1100 may pass through the retraction component aperture 302 as it is extended from the interior of the retraction component outwardly to a device mounting component 900.

The retraction component aperture 302 may additionally include a retraction component aperture perimeter, which may facilitate the passing of the tether 1100 through the retraction component aperture 302. For example, the retraction component aperture perimeter may be constructed using a metal, plastic, or other material. The retraction component aperture perimeter may help guide the tether as it passes through the retraction component aperture 302 to increase the consistency of direction in which the tether 1100 may extend and advantageously reduce wearing and fraying of the tether as it passes through the retraction component aperture 302.

Additional features may be included at least partially in a retraction component interior space 216 of the retraction component. For example, the retraction component interior space may include a spindle 214, retraction component spindle receiver, pulley 206, and/or other features. The spindle may include a spindle aperture 218 that may be at least partially positioned around the retraction component spindle receiver. The spindle aperture 218 may be located approximately at the center of the spindle.

A tether 1100 may be wound about the spindle 214 such that it may be extendable from the spindle. In at least one embodiment, the spindle 214 may include a rewinding feature to use stored energy to at least partially wind the tether 1100 around the spindle 214, for example, a spring. Those of skill in the art will appreciate additional rewinding features that may be used other than a spring after having the benefit of this disclosure, which are intended to be included in the scope of this disclosure. Ideally, the tether will have enough force to retract, but the force may be light enough to not be difficult for a user to pull a phone or other object attached to the tether 1100 to their face or elsewhere.

The retraction component 200 may additionally include a pulley 206, which may be located at least partially within the retraction component interior space 216. At least part of the tether 1100 may extend outwardly from the spindle 214 about the pulley 206. The pulley 206 may assist with repositioning and orienting the tether 1100 such that the tether 1100 may exit the retraction component 200 from an aperture on a desired surface, for example, the retraction component front surface 304. In one embodiment, the pulley 206 may be provided as an elongated and substantially cylindrical member that may receive and redirect the tether 1100 at multiple places along the pulley 206. In alternative embodiments, the pulley 206 may include a wheel, fixed element, or other feature that may operatively redirect the tether 1100 into the desired direction.

The retraction component 200 may include one or more mounting features for installation into another component, such as a pouch 1000. The mounting features may include one or more loops or protrusions manufactured into the retraction component enclosure 208, rails, hook-and-loop fasteners, and/or other features that would be appreciated by a person of skill in the art after having the benefit of this disclosure.

Figure 2:
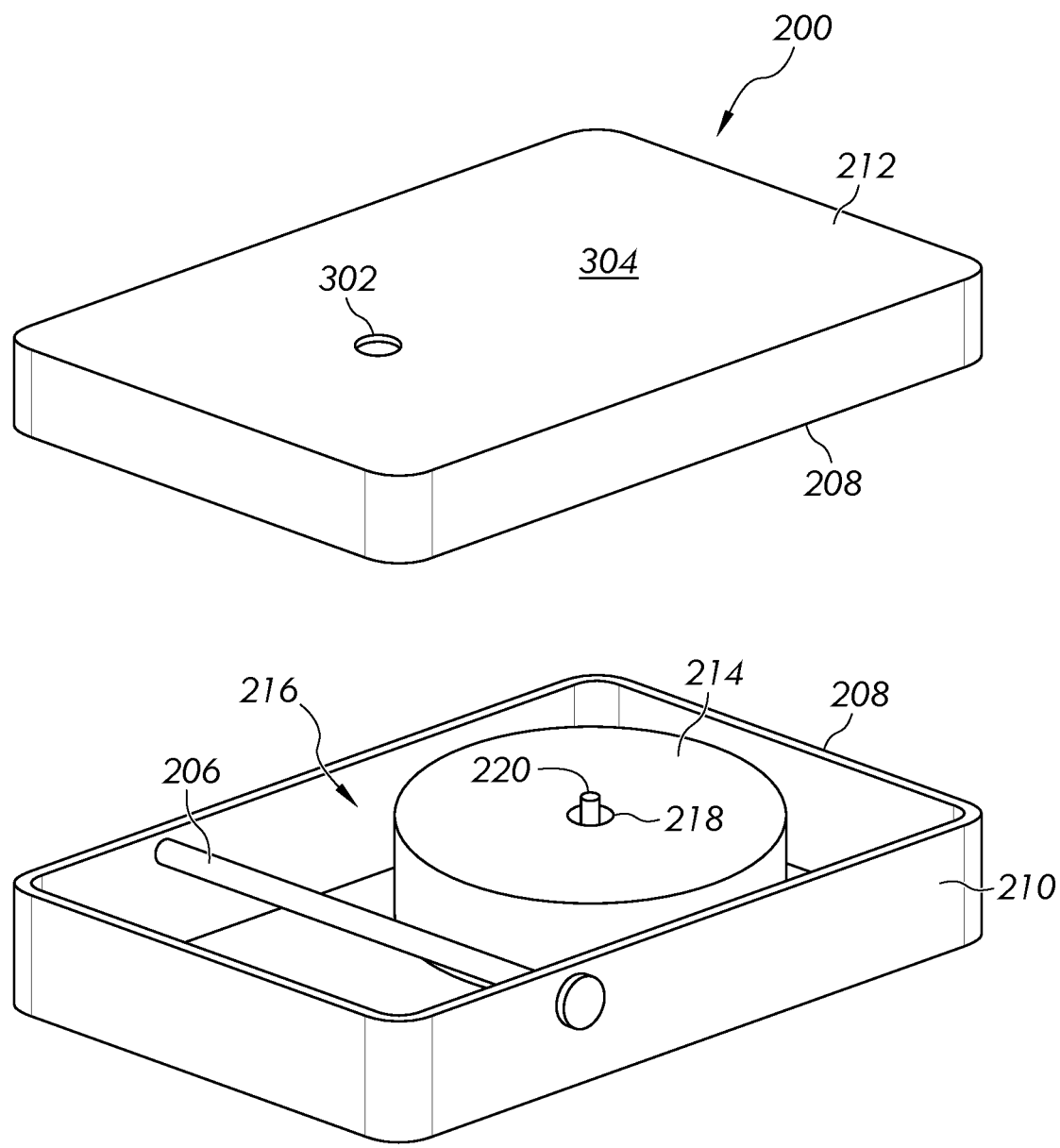
FIG. 2 is a perspective exploded view of a retraction component, according to an embodiment of this disclosure.
Figure 3:
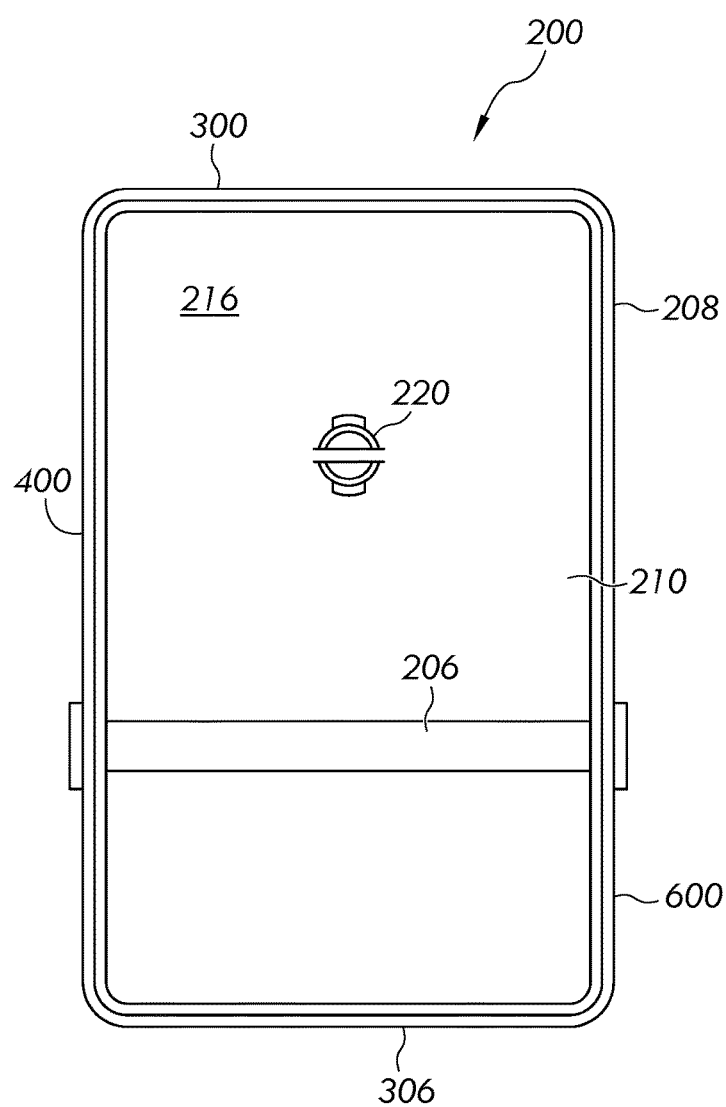
FIG. 3 is a front elevation view of a retraction component, according to an embodiment of this disclosure.
Figure 4:
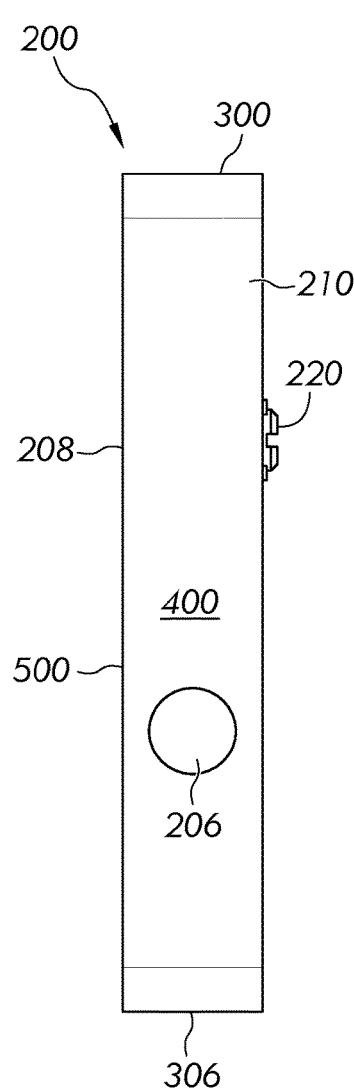
FIG. 4 is a first side elevation view of a retraction component, according to an embodiment of this disclosure.
Figure 5:
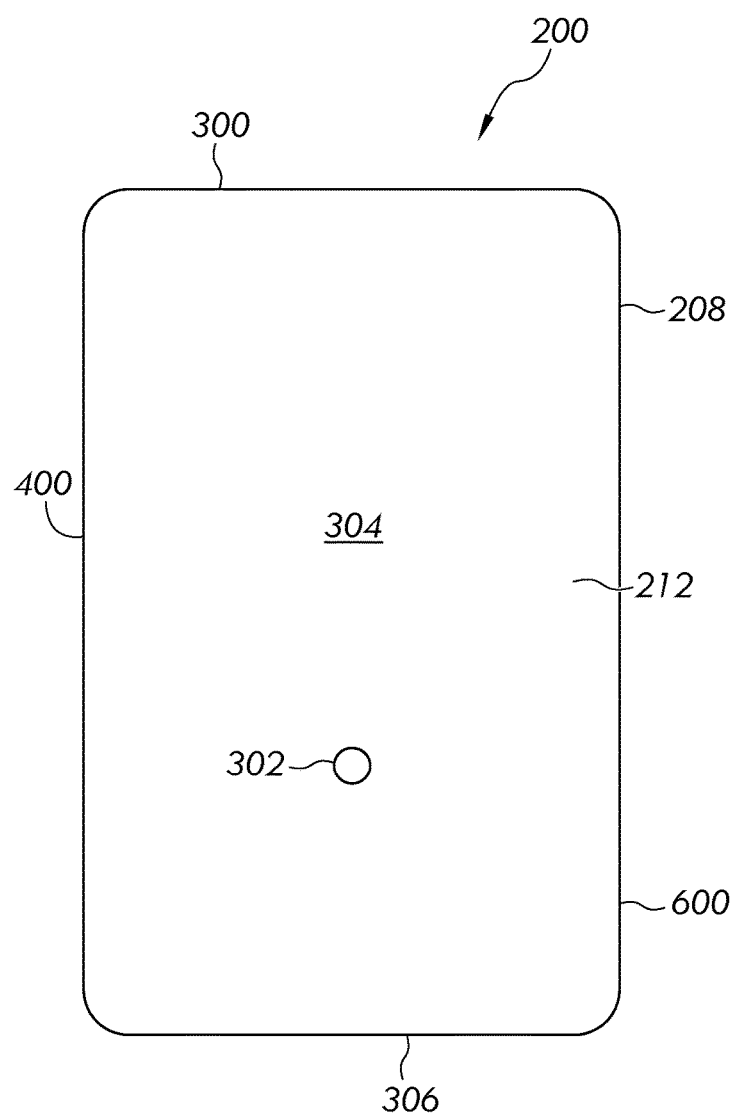
FIG. 5 is a rear elevation view of a retraction component, according to an embodiment of this disclosure.
Figure 6:
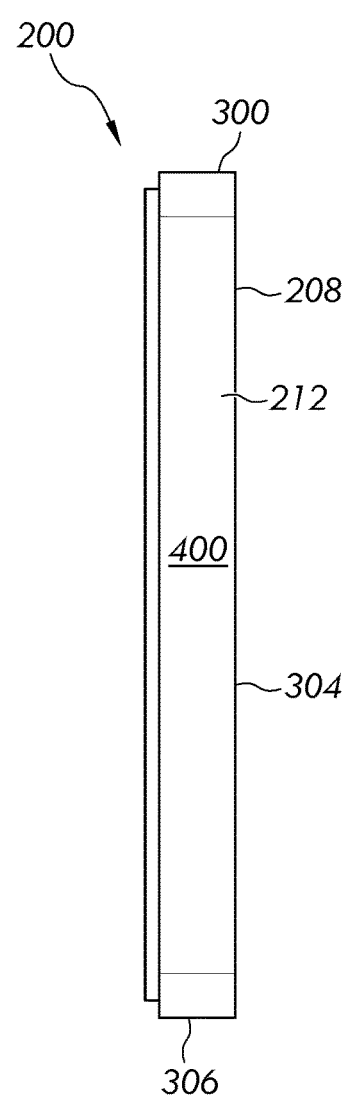
FIG. 6 is a second side elevation view of a retraction component, according to an embodiment of this disclosure.
Figure 7:
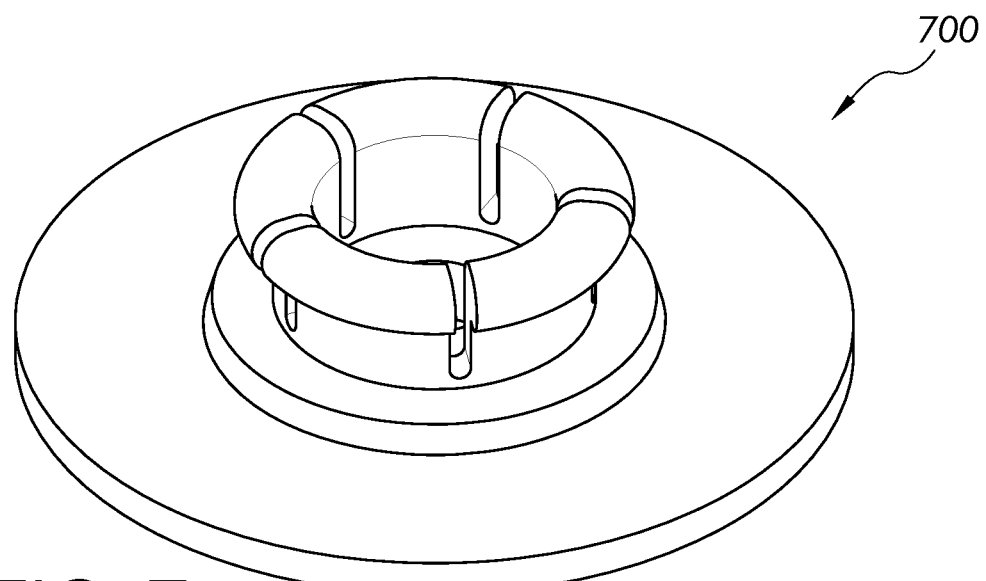
FIG. 7 is a perspective view of a device aspect of the device mounting component, according to an embodiment of this disclosure.
Figure 8:
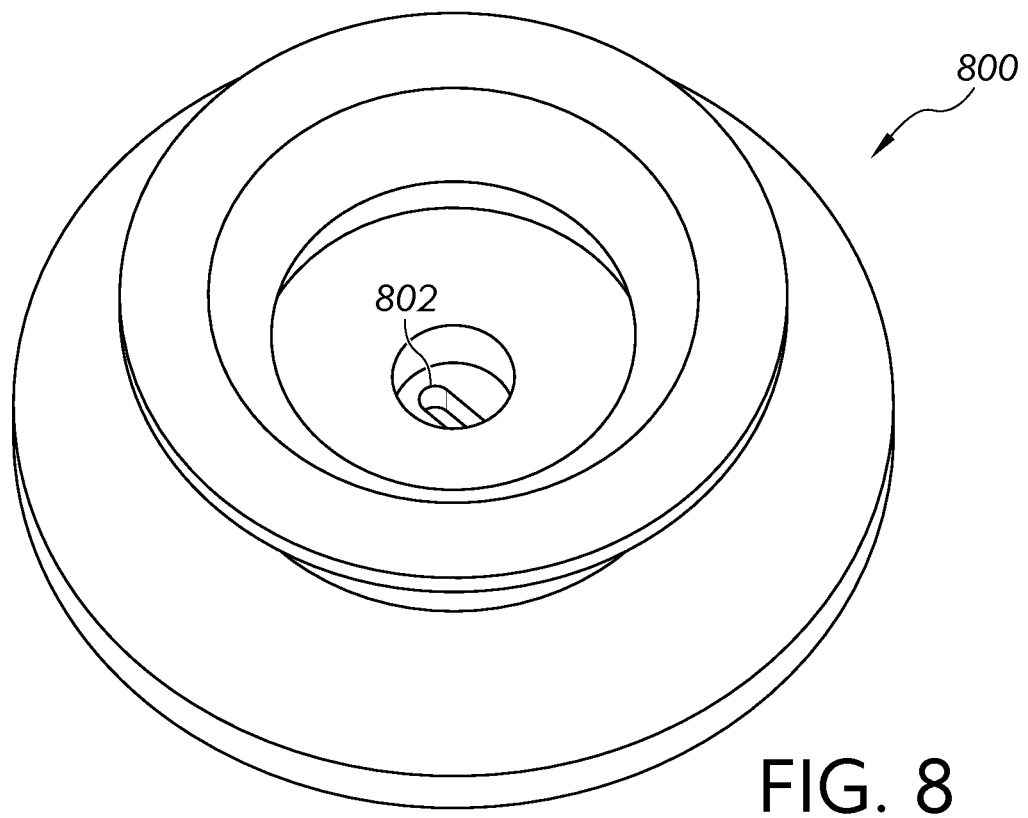
FIG. 8 is a perspective view of a tether aspect of the device mounting component, according to an embodiment of this disclosure.
Figure 11:
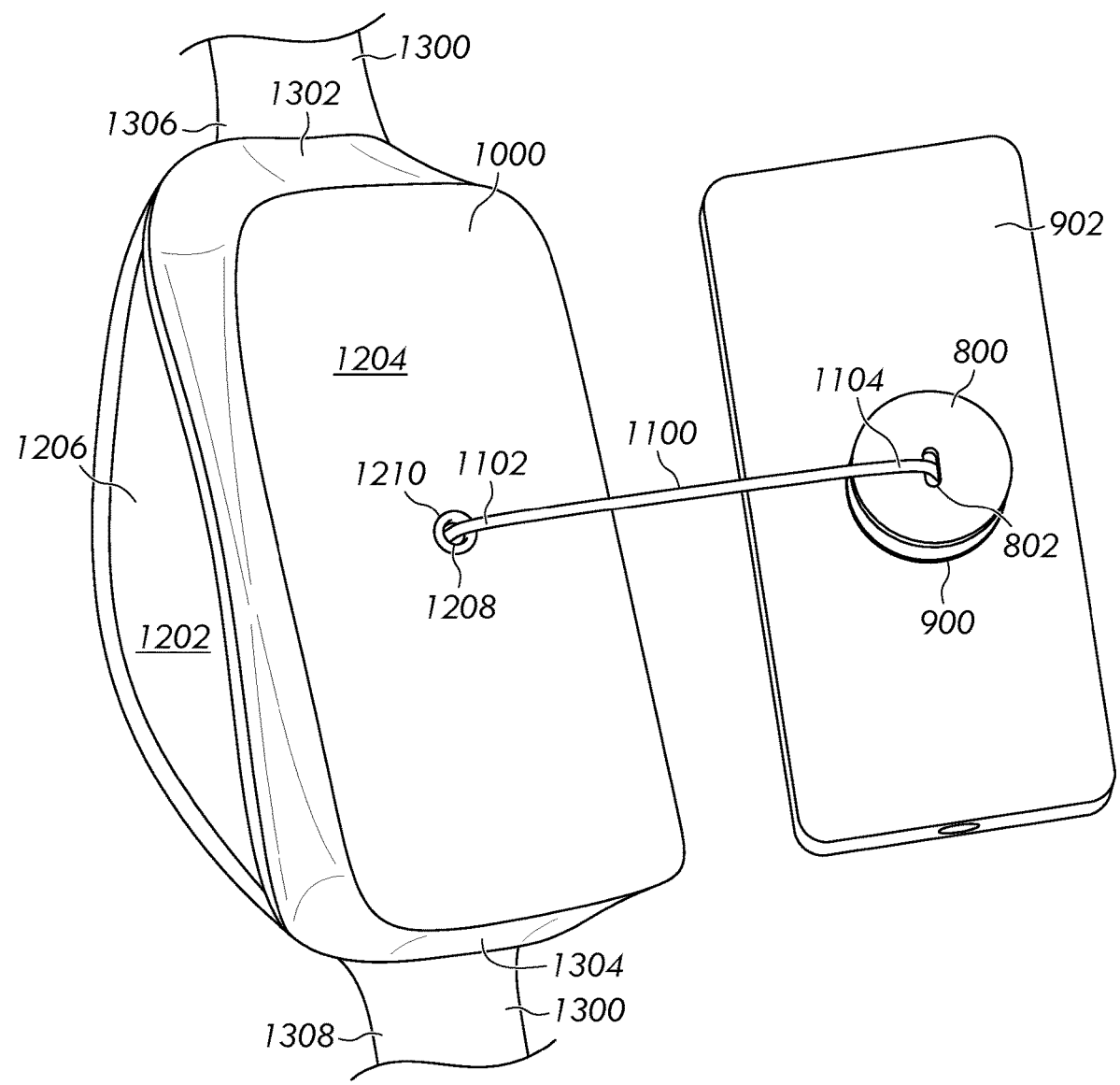
FIG. 11 is a perspective view of a device mounting component and tether, according to an embodiment of this disclosure.
Figure 12:
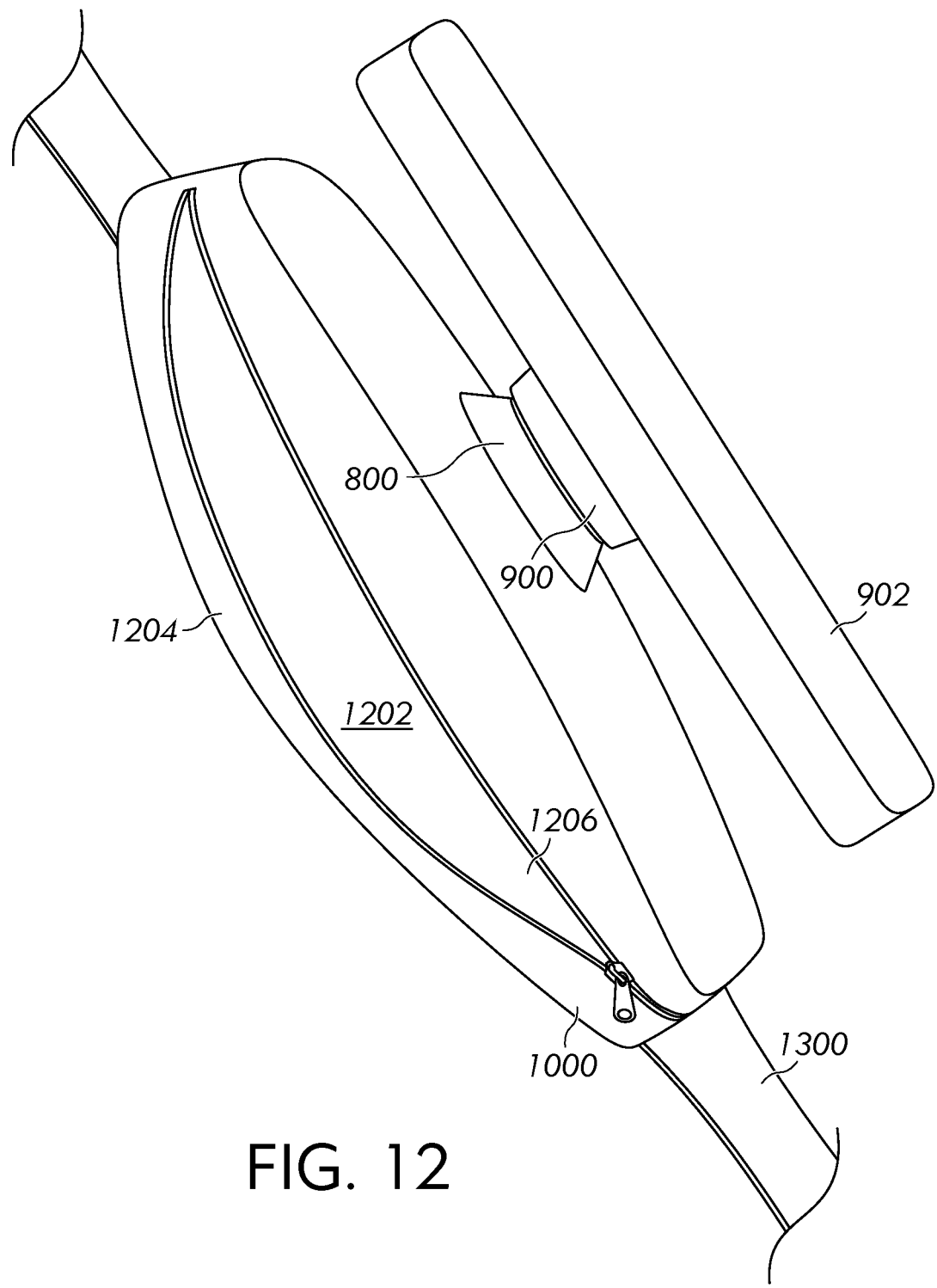
FIG. 12 is a perspective view of a pouch and device mounting component, according to an embodiment of this disclosure.
Figure 13:
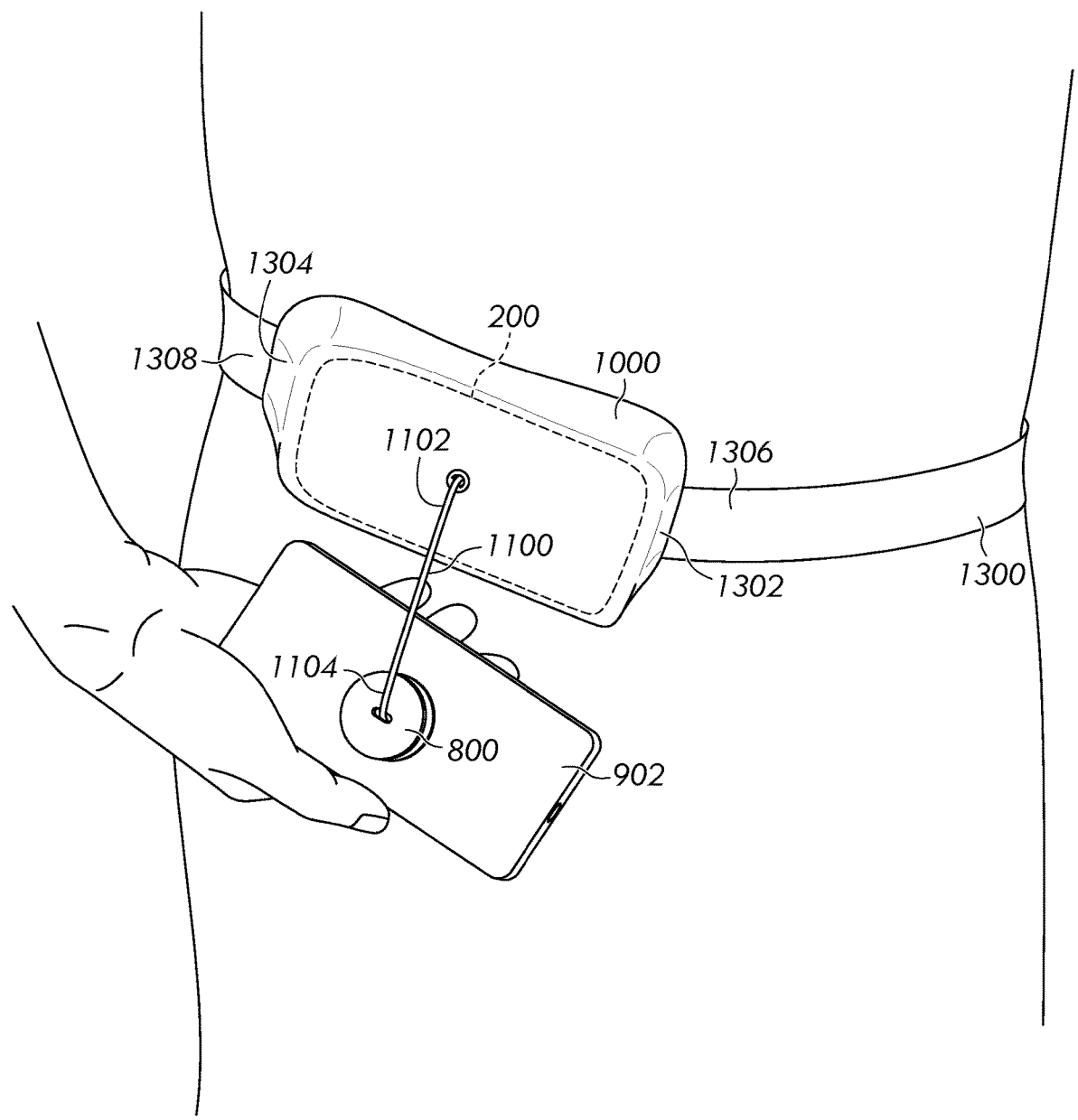
FIG. 13 is a perspective view of a tethering system worn by a user and partially extended, according to an embodiment of this disclosure.

The tether 1100 will now be discussed in greater detail. FIGS. 2, 11, and 13 highlight examples of the tether, which may also be shown in other figures. The tether may include a tether first end 1102 that may be attached to at least part of the retraction component 200 and a tether distal end 1104 that may be attached to a device mounting component 900. In one embodiment, the specific point on the tether material designated as the tether first end 1102 may vary as it is drawn from or retracted to the retraction component 200 such that the tether first end 1102 remains approximately near the point of the retraction component aperture 302. In one example, the tether first end 1102 may connect near to an interior part of the spindle 214 such that the tether may be wound about the spindle 214. Additionally, in one example, the tether distal end 1104 may be connected to a device mounting component 900 such as at a tether aspect 800 of the device mounting component 900.

The tether may be directed through a retraction component aperture 302 of the retraction component 200 such that it may be connected to a device mounting component 900. The retraction component aperture 302 may align with a pouch aperture 1208 on the pouch 1000 such that the tether 1100 may pass through the retraction component 200 and the pouch 1000 at approximately aligned points. A pouch aperture perimeter 1210 may optionally be included substantially around the pouch aperture 1208. For example, the tether 1100 may be drawn outwardly from an approximately front-middle location of the pouch 1000, passing through the central opening of the retraction component front surface 304 of the retraction component 200, to be connected with the device connection component. The tether 1100 may additionally retract back into the retraction component 200 via the retraction component aperture 302 and/or pouch aperture 1208.

The tether 1100 may be constructed using one or more of a variety of materials with enough strength to hold and substantially secure an attached device. For example, the tether 1100 may be constructed using materials with a high tensile strength, such as and without limitation, cotton, hemp, nylon, polyester, polypropylene, polyethylene, carbon fiber, and/or other fibers that would be apparent to a person of skill in the art after having the benefit of this disclosure. Additionally, the tether 1100 may include a braiding, plaiting, and/or other feature to increase the durability and strength of the material.

The pouch 1000 will now be discussed in greater detail. FIGS. 10-13 highlight examples of the pouch, which may also be shown in other figures. The pouch may include a pouch interior 1202 and a pouch exterior 1204. The pouch interior may receive one or more other components and/or objects. For example, the pouch interior may receive the retraction component 200. In at least one embodiment, the retraction component 200 may be at least partially installed to an interior of the pouch 1202. Additionally, the pouch may hold additional components and/or objects, for example, to store ID cards, credit cards, money, and other personal items. The pouch may include a pouch opening 1206 into which these items may be inserted and may be at least partially sealable, for example, by using a zipper. Skilled artisans will appreciate additional pouch closing techniques that would be included within the scope of this disclosure.

The pouch exterior 1204 may include a pouch aperture 1208, which may be located on a pouch exterior front pouch surface or another location. The pouch exterior 1204 may additionally include features for mounting a belt or strap to the pouch. For example, the pouch may include a pouch first belt attachment interface at a pouch first end 1302 and a pouch second belt attachment interface at a pouch second end 1304.

The belt 1300 will now be discussed in greater detail. FIGS. 1 and 11-13 highlight examples of the belt, which may also be shown in other figures. Skilled artisans will appreciate that use of the term "belt" is not intended to limit an invention enabled by this disclosure to only applications in which the accessory is wearable about a waist. Belts may be broadly applied to include virtually any strap installable to a pouch or other aspect of the accessory, without limitation. For example, the term belt may apply to waistbands, armbands, wristbands, shoulder straps, and/or other application that may provide a mountable connection around the circumference and/or boundaries of a device or body of a location onto which the system may be installed. The belt may be constructed using materials with sufficient strength, such as and without limitation, cotton, hemp, nylon, polyester, polypropylene, polyethylene, carbon fiber, and/or other fibers that would be apparent to a person of skill in the art after having the benefit of this disclosure. The belt may be at least partially stretchable and/or elastic. Additionally, the belt may include weaving, braiding, and/or other features to increase the durability and strength of the material.

The belt 1300 may be installed to the pouch 1000. In one illustrative embodiment, opposite ends of the belt 1300 may be attached to portions of the pouch 1000 at opposite sides, for example, a belt first end 1306 may be attached to a pouch first end 1302 and a belt second end 1308 may be attached to a pouch second end 1304 such as via sewing, welding, or another attachment technique that would be appreciated by a person of skill in the art after having the benefit of this disclosure. In one example, a belt first pouch attachment interface of the belt 1300 may be installed to a pouch first belt attachment interface of the pouch 1000. Additionally in this example, a belt second pouch attachment interface of the belt 1300 may be installed to a pouch second belt attachment interface of the pouch 1000.

In one embodiment, the belt may be configured as a unitary length of material, which may optionally be adjustable. Distal ends of the belt may be installed to distal ends of the pouch. In another embodiment, the belt may include multiple portions that may be connected to form the belt. For example, the belt may include a belt first portion 1306 installed to a first end of the pouch 1302 and a belt second portion 1308 installed to the second end of the pouch 1304. The belt first portion and belt second portion may be connected at the respective ends distal to the pouch, for example, via a clip, buckle, hook-and-loop, and/or other attachment interface to wrap around at least part of a user and/or mounting location and be connected. One or more of the belt first portion and/or belt second portion may be at least partially adjustable. Additionally, one or more of the belt first portion and/or belt second portion may be at least partially stretchable and/or elastic.

The device mounting component 900 will now be discussed in greater detail. FIGS. 7-13 highlight examples of the device mounting component, which may also be shown in other figures. The device mounting component 900 may be located and/or operatively installed at the tether distal end 1104 of the tether 1100, which may be approximately opposite to the tether first end 1102 installed to the retraction component 200. The device mounting component 900 may be a substantially interchangeable object to operatively connect a phone or other device 902 to the tether 1100. In one embodiment, the device mounting component 900 may be installable to a phone or case designed to fit a phone. In another embodiment, the device mounting component 900 may include a case configured to receive a phone or other device. Various cases may be receivable by the device mounting component such as to accommodate operation with various models of phones and other devices.

In one embodiment, the device mounting component 900 may be provided as a unitary construction including the features required to receive the tether 1100 and operatively attach to the phone or other device 902, for example, via a fitted case. In this embodiment, various configurations of the device mounting component 900 may be attachable to the tether 1100 which may correspond with a type of phone or other device 902 carried by the user.

In another embodiment, the device mounting component 900 may include multiple aspects that collectively form the device mounting component 900. For example, the device mounting component 900 may include a device aspect 700 and tether aspect 800. An example of the device aspect 700 may be seen in FIG. 7, without limitation. The device aspect 700 may be installable to the device 902 via adhesion, welding, hook-and-loop, case, or otherwise, without limitation. In one embodiment, the device aspect 700 of the device mounting component 900 may be installed to and/or include a case designed to receive a phone or other device 902.

The device mounting component 900 may additionally include a tether aspect 800, to which the tether 1100 may be installed. An example of the tether aspect 800 may be seen in FIG. 8, without limitation. The tether aspect 800 may include a device mounting component aperture 802 into which at least part of the tether 1100 may be inserted, received by, and/or installed to. The tether aspect 800 may include features to receive and removably secure the device aspect 700 of the device mounting component 900.

Figure 9:
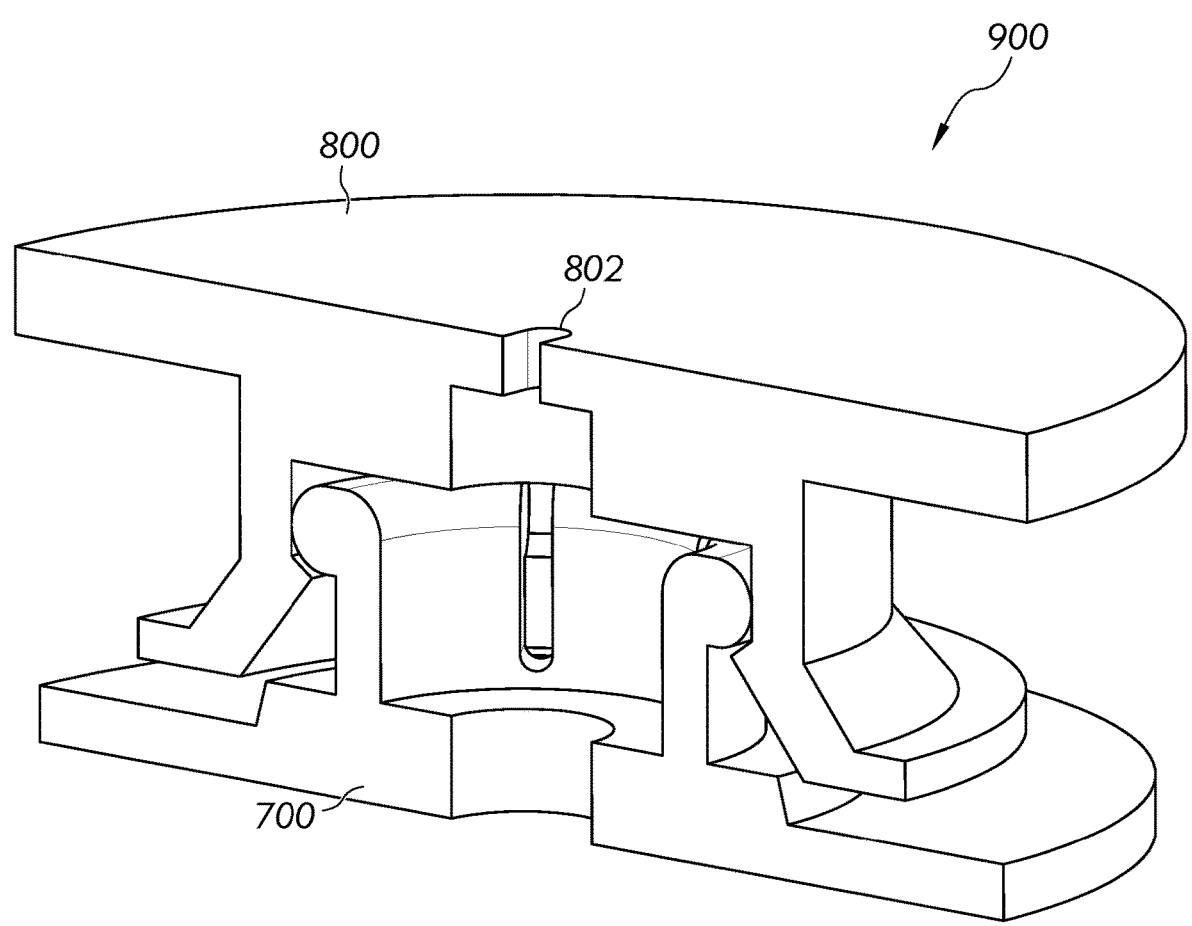
FIG. 9 is a perspective bisected view of a device mounting component, according to an embodiment of this disclosure.
Figure 10:
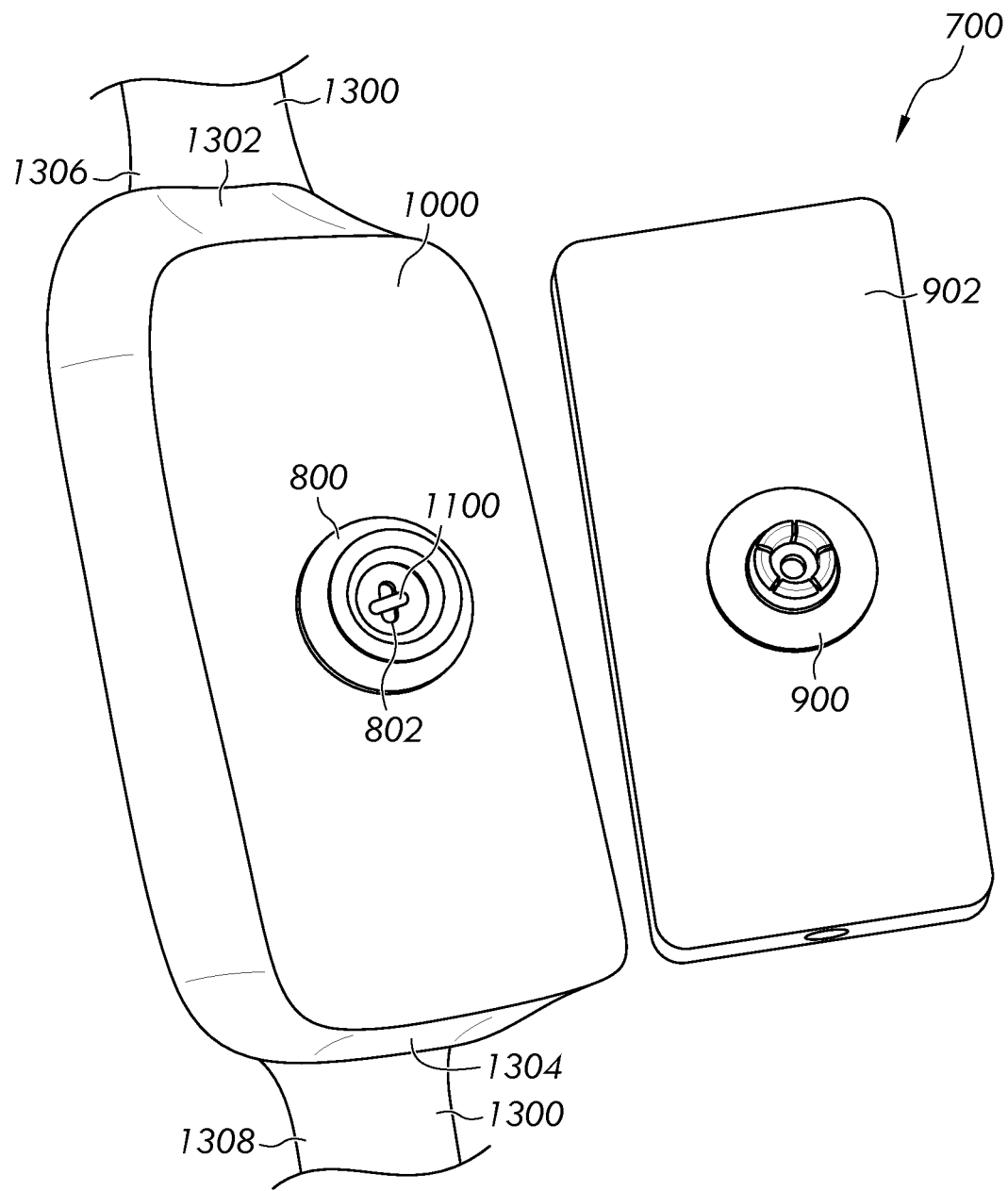
FIG. 10 is a perspective view of a pouch and device mounting component, according to an embodiment of this disclosure.

The device aspect 700 may be received by and at least partially secured by the tether aspect 800 of the device mounting component 900, as may be seen in FIG. 9, without limitation. The device mounting component 900 may optionally include a release feature, which may allow the phone or device 902 to be disconnected from the tether 1100 should the user wish to operate the phone freely. The release feature may include a quick-release. Even after a phone or device 902 has been detached from the tether 1100, it may still benefit from additional protection from the phone case used to connect and/or reconnect to the tether 1100. Once detachment from the tether 1100 is no longer necessary or desired, the user may reattach the phone or device to the tether 1100 via connecting the device aspect 700 to the tether aspect 800 of the device mounting component 900.

In operation, a method may be provided for securing a device to a source location. Those of skill in the art will appreciate that the following methods are provided to illustrate an embodiment of the disclosure and should not be viewed as limiting the disclosure to only those methods or aspects. Skilled artisans will appreciate additional methods within the scope and spirit of the disclosure for performing the operations provided by the examples below after having the benefit of this disclosure. Such additional methods are intended to be included by this disclosure.

In an example operation of a tethering system enabled by this disclosure, a user may desire to substantially secure their phone or other device 902 to their person via a tether 1100. The user may install their phone into a case with a device aspect 700 of the device mounting component 900 attached. The user may also wear a pouch 1000 or other object housing the retraction component 200 from which a tether 1100 may be extended. To connect the phone to the tether 1100 extending from the retraction component 200, the user may connect the device aspect 700 and tether aspect 800 of the device mounting component 900, substantially and operatively installing the phone to the retraction component 200 via the tether 1100 and device mounting component 900. The tether 1100 may then be at least partially retracted into the retraction component 200, using the retraction force to substantially hold the device against a surface of the pouch 1000 and/or retraction component 200.

If the user desires to use the attached phone or device 902 without disconnecting the tether 1100, the user may simply lift the phone from its resting position to a desired position, for example, to the face to make a call or midway to the body to interact with the screen. When the user is done, the user may simply allow the tether 1100 to retract back into the retraction component 200 to hold the phone or other device near the pouch 1000 and/or retraction component 200.

If the user desires to use the phone without being attached to the tether 1100, the user may simply lift the phone from its resting position and disconnect the aspects of the device mounting component 900 as discussed above. The user may then move the disconnected phone to the desired position, for example, to the face to make a call or midway to the body to interact with the screen. When the user is done, the user may simply reattach the aspects of the device mounting component 900 to reinstall the phone to the tether 1100. The user may then allow the tether 1100 to retract back into the retraction component 200 and hold the phone or other device near the pouch 1000 and/or retraction component 200.

While various aspects have been described in the above disclosure, the description of this disclosure is intended to illustrate and not limit the scope of the invention. The invention is defined by the scope of the claims of this nonprovisional utility patent application and not the illustrations and examples provided in the above disclosure. Skilled artisans will appreciate additional aspects of the invention, which may be realized in alternative embodiments, after having the benefit of the above disclosure. Other aspects, advantages, embodiments, and modifications are within the scope of the claims of this nonprovisional utility patent application.

What is claimed is:

1. A device tethering system comprising:
    a retraction component;
    a tether extending outwardly from a front retraction component surface of the retraction component, wherein a device mounting component is attached to a distal end of the tether;
    a mounting feature to hold the retraction component; and
    a belt installed to the mounting feature; wherein the retraction component further comprises an interior space containing a spindle on to which the tether is at least partially and reversibly wound; wherein the retraction component further comprises a pulley that is substantially cylindrical over which the tether passes; wherein the spindle and the pulley rotate on different axes; wherein the different axes of the spindle and the pulley are orthogonal with respect to each other.

2. The system of claim 1, wherein the retraction component is substantially held within the mounting feature and the tether extends through a retraction component aperture located on the front retraction component surface and through a front mounting feature surface of the mounting feature.

3. The system of claim 2, wherein the retraction component aperture further comprises an aperture perimeter through which the tether is passable.

4. The system of claim 1, wherein the spindle comprises a rewinding feature.

5. The system of claim 1, wherein the tether is constructed of a material selected from the group consisting of cotton, hemp, nylon, polyester, polypropylene, polyethylene, and carbon fiber.

6. The system of claim 1, wherein the device mounting component comprises a device aspect to receive a device and a tether aspect installable to the distal end of the tether.

7. The system of claim 6, wherein the device aspect and the tether aspect are reversibly interlocking.

8. The system of claim 1, wherein the device mounting component comprises a release feature for disconnection of a device received by the device mounting component from the tether.

9. A device tethering system comprising:
- a retraction component comprising an interior space comprising a spindle and a pulley;
- a tether at least partially, reversibly wound about the spindle, passed over the pully, and extending outwardly through a retraction component aperture;
- a device mounting component comprising a device aspect to receive a device and a tether aspect installed to a distal end of the tether; and
- a mounting feature to hold the retraction component and at least one item;
- wherein the retraction component is removable from the mounting feature;
- wherein the retraction component aperture is located on a front retraction component surface of the retraction component; wherein the pulley is substantially cylindrical over which the tether passes; wherein the spindle and the pulley rotate on different axes; wherein the different axes of the spindle and the pulley are orthogonal with respect to each other.

10. The system of claim 9, further comprising a belt installed to the mounting feature.

11. The system of claim 9, wherein the retraction component aperture is located at an approximately central point on the front retraction component surface.

12. The system of claim 9, wherein the device aspect and the tether aspect are reversibly interlocking.

13. The system of claim 9, wherein the device mounting component further comprises a release feature allowing for disconnection from the tether.

14. A method of providing a device tethering system comprising:
(a) providing a tether extending outwardly from a retraction component;
(b) attaching a device mounting component to a distal end of the tether, wherein the device mounting component comprises a device aspect and a tether aspect;
(c) removably housing the retraction component within a mounting feature;
(d) removably receiving a device via the device aspect; and
(e) installing the tether aspect to the distal end of the tether; wherein the retraction component further comprises an interior space containing a spindle on to which the tether is at least partially and reversibly wound; wherein the retraction component further comprises a pulley that is substantially cylindrical over which the tether passes; wherein the spindle and the pulley rotate on different axes; wherein the different axes of the spindle and the pulley are orthogonal with respect to each other.

15. The method of claim 14, wherein the mounting feature is installed to a belt and further comprises a mounting feature first belt attachment interface at a mounting feature first end and a mounting feature second belt attachment interface at a mounting feature second end.

16. The method of claim 14, further comprising:
(f) at least partially extending the tether through an aperture on the front retraction component surface of the retraction component and through a front mounting feature surface of the mounting feature.

17. The method of claim 14, wherein the tether is selectively rewindable into the retraction component.

18. The method of claim 14, wherein the device mounting component further comprises a release feature allowing for disconnection from the tether.

* * * * *